United States Patent [19]

Fujisaki et al.

[11] Patent Number: 4,746,478
[45] Date of Patent: May 24, 1988

[54] METHOD AND APPARATUS FOR PRODUCTION OF FOAMED THERMOPLASTIC MATERIAL

[75] Inventors: Hiromu Fujisaki, Saitama; Motoshige Hayashi; Motokazu Yoshii, both of Nara, all of Japan

[73] Assignee: Sekisui Kaseihin Kogyo Kabushiki Kaisha, Nara, Japan

[21] Appl. No.: 888,592

[22] Filed: Jul. 23, 1986

[30] Foreign Application Priority Data

Jul. 24, 1985 [JP] Japan .................. 60-163564
Sep. 5, 1985 [JP] Japan .................. 60-196747

[51] Int. Cl.$^4$ ............... B29C 67/22; B29C 47/50; B29C 47/64
[52] U.S. Cl. ......................... 264/53; 264/54; 264/DIG. 5; 366/280; 366/292; 425/205; 425/208; 425/209; 425/817 C
[58] Field of Search ............... 264/53, 54, 51, DIG. 5; 425/817 C, 205, 208, 209; 366/280, 292

[56] References Cited

U.S. PATENT DOCUMENTS

| | | | |
|---|---|---|---|
| 2,669,751 | 2/1954 | McCurdy et al. | 264/53 |
| 3,751,377 | 8/1973 | Buckner | 264/53 X |
| 4,214,862 | 7/1980 | Kolossow | 264/51 X |
| 4,302,409 | 11/1981 | Miller et al. | 264/53 X |
| 4,419,014 | 12/1983 | Gale | 366/99 |
| 4,436,679 | 3/1984 | Winstead | 264/53 X |
| 4,454,087 | 6/1984 | Hayashi et al. | 264/53 |
| 4,548,776 | 10/1985 | Holdredge, Jr. | 264/53 X |

FOREIGN PATENT DOCUMENTS

48-544 1/1973 Japan .
54-42026 12/1979 Japan .

Primary Examiner—Philip Anderson
Attorney, Agent, or Firm—Armstrong, Nikaido, Marmelstein & Kubovcik

[57] ABSTRACT

A method and apparatus for the production of a foamed thermoplastic material. A cavity transfer mixer is provided between a screw extruder which melts, or fuses, the thermoplastic material, and a cooler. The cavity transfer mixer enables the formation of uniform and well mixed admixtures of a foaming agent and a thermoplastic material and, optionally, other desired additives.

11 Claims, 2 Drawing Sheets

METHOD AND APPARATUS FOR PRODUCTION OF FOAMED THERMOPLASTIC MATERIAL

BACKGROUND OF THE INVENTION

1. Field of the Invention

This invention relates to a method and apparatus for producing foamed thermoplastic materials by homogeneously mixing thermoplastics with a foaming agent and other desired additives and continuously extruding the mixture.

2. Description of the Prior Art

There are various methods for producing foamed thermoplastic materials and extruders are now in wide use for this purpose. The producing of foamed thermoplastic materials using an extruder is practically advantageous in that, after a thermoplastic is homogeneously mixed with a foaming agent or other additive under pressure, the mixture is extruded under low pressure to continuously manufacture foamed theromplastic materials of desired shapes, e.g., sheets or plates.

In the above method of manufacture, however, importance has been attached to the fact that a foaming agent or other additive should homogeneously be mixed with the molten thermoplastic and the mixture extruded after the molten plastic composition containing the foaming agent is uniformly cooled sufficiently to be suitable for foaming.

As a result, there have been proposed various methods and apparatus for homogeneously mixing a thermoplastic with a foaming agent or the like and uniformly cooling the plastic composition containing the foaming agent. U.S. Pat. No. 3,751,377 discloses a method and apparatus wherein a static mixer is installed following an extruder having a screw in order to mix the molten plastic with a foaming agent and uniformly cool the mixture to a temperature fit for foaming. Although such an arrangement has succeeded in producing thick, large, low-density foamed materials to a certain extent, it has drawbacks in that the extrusion rate is reduced because the flow resistance of the plastics to the static mixer is strong, the static mixer is partially deformed or damaged particularly when it is cooled from the outside and the dispersion properties of the mixed foaming agent are insufficient.

Attempts have been made to remedy such shortcomings. As disclosed in U.S. Pat. No. 4,454,087, a rotary mixing cooler and a zigzag mixer as a kind of static mixer are simultaneously installed following the extruder. Although the zigzag mixer is prevented from deforming in this method because it is not cooled, there is still a desire to manufacture further low-density foamed materials and those in which the improved homogeneous dispersion of an additive is ensured.

On the other hand, U.S. Pat. No. 4,419,014 discloses a method for homogeneously mixing molten plastics, rubber and the like with other additives, wherein an extruder-mixer is equipped with a cavity transfer mixer directly coupled to the front end of the screw contained in the extruder.

The present inventors have conceived of the application of the cavity transfer mixer used in the above extruder-mixer to the manufacture of foamed thermoplastic materials and found that further improved foamed thermoplastic materials can be manufactured by introducing the cavity transfer mixer into the conventional extrusion process.

SUMMARY OF THE INVENTION

The present invention is directed to solving the problems heretofore posed in the manufacture of foamed thermoplastic materials based on the above-described knowledge of the prior art. According to the present invention, in a method and apparatus for the production of foamed thermoplastic materials, the apparatus comprising an extruder for melting and extruding the thermoplastic material and a cooling unit for cooling the molten thermoplastic containing a foaming agent to a temperature suitable for foaming, an improvement is provided wherein a rotor is supported in a stator between the extruder and the cooling unit, the gap between the stator and the rotor being used as a passageway for the molten thermoplastic and wherein a number of isolated cavities are respectively formed on the inner face of the stator and the outer face of the rotor arranged opposite thereto, the cavities on both the stator and the rotor overlapping one another during their rotations and forming a mixer by causing the molten plastic to be transferred between the cavities. The molten plastic is mixed with the foaming agent or any other additive in the upstream side of the mixer.

An object of the present invention is to provide a method and apparatus capable of homogeneously mixing a molten thermoplastic with a large amount of foaming agent so that highly foamed, low-density, thick thermoplastic materials are obtained.

Another object of the present invention is to provide a method and apparatus capable of ensuring the improved homogeneous dispersion of a foaming agent or other additive in a molten plastic, so that uniformly foamed thermoplastic materials having excellent physical properties and quality are obtained. Moreover, foamed materials having a homogeneous dispersion of a nucleating agent such as fine powdery talc cells and excellent post processability are also obtainable.

Still another object of the present invention is to provide a method and apparatus capable of homogeneously mixing a plurality of incompatible thermoplastics, so that many kinds of thermo plastics become mixable. Moreover, foamed materials having desired properties can be manufactured.

A further object of the present invention is to provide a method and apparatus capable of homogeneously mixing thermoplastics with a foaming agent which is considerd not easily mixable therewith. This is advantageous to the manufacture of foamed materials since a foaming agent can be selected from many kinds of materials.

DETAILED DESCRIPTION OF THE INVENTION

Figure 1:
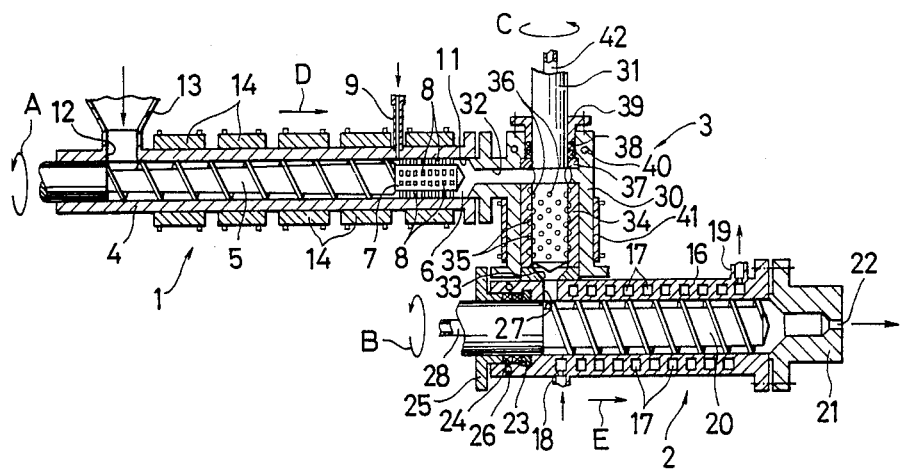
FIG. 1 is a vertical sectional view of an embodiment of the apparatus of the present invention.

Thermoplastics which can be subjected to extrusion-foaming according to the present invention are not particularly limited. Representative thermoplastics include polystyrene, styrene-acrylonitrile copolymer, styrene-acrylonitrile-butadiene copolymer, styrene-maleic anhydride copolymer, styrene-ethylene copolymer, poly-α-methylstyrene, polyethylene, polypropylene, ethylene-propylene copolymer, ethylene-vinyl acetate copolymer, polyvinyl chloride, polymethyl methacrylate, polyamide, etc. these copolymers may be used independently or in combination. Since relatively incompatible polymers can may be uniformly mixed according to the present invention, a wide range; of thermo plastics can be selected. Accordingly, thermoplastics having desired physical properties are readily producible.

Foaming agents which can be used in the present invention are also not limited. Volatile or decomposable foaming agents are normally used.

As volatile foaming agent there may be mentioned aliphatic hydrocarbons such as propane, butane, isobutane, pentane, neopentane, isopentane, and the like; alicyclic hydrocarbons such as cyclobutane, cyclopentane, cyclohexene, and the like; methylchloride; methylene chloride; dichlorofluoromethane; chlorotrifluoromethane; dichlorodifluoromethane; chlorodifluoromethane; trichlorofluoromethane; trichlorotrifluoroethane; and dichlorotetrafluoroethane. As decomposable foaming agents there may be mentioned dinitrosopentamethylenetetramine; trinitrosotrimethylenetriamine; p,p'-oxybis(benzene sulfonyl hydrazide); azodicarbonamide, and the like. These foaming agents may be used independently or in combination.

A foaming agent is added on the upstream side of a mixer according to the present invention. The normal mixing method comprises heating and melting thermoplastics in an extruder and supplying a foaming agent to the extruder under pressure. Another method is supplying thermoplastics containing a foaming agent to an extruder.

When a large amount of foaming agent is mixed in order to obtain a low-density foamed material, e.g., 100 parts by weight of thermoplastic mixed with 5–50 parts by weight of a volatile foaming agent, it is preferred to pre-knead the molten thermoplastic and a foaming agent in an extruder or by any other mixing means and then supply the mixture to a mixer.

According to the present invention, an additive normally used is added when the foamed material is made. As additives, there are nucleating agents retardants, stabilizers, lubricants, plasticizers, coloring agents, fillers, etc.

Extruders for use in melting and extruding thermoplastics according to the present invention are single or twin screw extruders, whose screws are preferably equipped with pins or other mixing means after the foaming agent is supplied under pressure.

Cooling units usable according to the present invention are those developed and conventionally used for the manufacture of foamed thermoplastic materials, such cooling units being provided with heat exchanging means and being capable of regulating the temperature of various plastics. It is preferred to employ a cooling unit having a rotary shaft equipped with vanes inside the outer cooling cylinder as disclosed in U.S. Pat. Nos. 4,454,087 and 2,669,751 and Japanese Pat. Nos. 544/73 and 42026/79. It is also preferred to use a cooling extruder which is larger in diameter than the extruder for melting the thermo plastics so as to uniformly cool the thermo plastics by slowly turning it with the screw with a smaller pumping action.

Mixers usable according to the present invention are cavity transfer mixers for melting thermo plastics having rotor supported in stator the gap between the stator and the rotor being used as a passageway for the molten plastics. A number of isolated cavities are formed on the inner face of the stator and the outer face of the rotor, respectively. The cavities formed on the stator and the rotor are positioned so that they overlap one another during rotation. The cavities may be semi-spherical, cylindrical and rhombical but should preferably be a semi-spherical shape which causes little congestion of molten plastics. The cavities should be cross-stitched (refer to the drawings) on the inner face of the stator and the outer face of the rotor in the respective axial and circumferential directions. The total area of the opening of the cavities should be increased, in terms of the transfer face thereof, to over 60% of the area of the inner face of the stator or the outer face of the rotor The mixer should be positioned in a location where the temperature and pressure are highest during the extrusion-foaming process. Accordingly, the mixer may be coupled to the front end of the screw of the extruder so that the mixer may rotate synchronously with the screw or installed so that the mixer can rotate independently. In case of the latter, heating and mixing are conveniently regulated because the number of rotations is freely controllable according to the kind of thermoplastics and kind of foaming agents and other additives. In other words, the mixer may be rotated at a low speed when a fire retardant which is subject to heat decomposition and a fibrous material readily cut upon the application of high shear force are used and may be rotated at a high speed when a volatile foaming agent having a viscosity different from that of the plastic is employed.

As dies usable according to the present invention, there are ordinarily T-shaped dies, coat hanger dies, fish tale dies, circular dies, etc. with sizing dies as occasion demands.

The construction and effects of the present invention will now be described in concrete terms according to selected embodiments of the invention.

Referring to FIG. 1, an embodiment of the apparatus of the present invention will be described. In FIG. 1, there is shown an arrangement of a main extruder 1, a cooling extruder 2 installed parallel to the main extruder 1 and having its axis shifted from that of the latter and a mixer 3 installed between the extruders 1, 2.

The main extruder 1 comprises first barrel 4; a first cantilever screw 5 rotatably inserted in the first barrel 4; a first kneader means 6 installed at the front end of the first screw 5; a column 7 installed at the front end of the screw shaft; a number of pins 8 which protrude from the periphery of the column 7; an inlet 9 for introducing a foaming agent under pressure, the inlet 9 being positioned opposite to the boundary between the first screw 5 of the first barrel 4 and the first kneader means 6; an outlet 11 formed at the end where the screw of the first barrel 4 floats; an inlet 12 for materials, the inlet 12 being formed at the end where the screw of the first barrel 4 is supported; a material hopper 13 installed at the inlet 12 and heaters 14 installed on the periphery of the first barrel 4.

The cooling extruder 2 comprises a second barrel 16 having a spiral refrigerant passageway 17; an inlet 18 and an outlet 19 of the refrigerant passageway 17; a second cantilever screw 20 rotatably inserted into the second barrel 16; die 21 fixed to the end where the screw 20 of the second barrel 16 floats, the die 21 being equipped with an outlet for thermo plastics; a bearing 23 for rotatably supporting the base of the second screw 20; packing 24; a packing pusher 25; a passageway 26 of a refrigerant for cooling the packing; a inlet 27 for the injection of thermo-plastics, the inlet 27 being formed at the end where the screw 20 of the second barrel 16 is supported; and a pipe 28 for supplying a refrigerant to the inside of the second screw 20.

The mixer 3 comprises a fixed cylinder 30; a cantilever rotor 31 rotatably inserted in the fixed cylinder 30, the axis thereof being perpendicular to those of the first and second screws 5, 20 an; inlet 32 formed on one side where the rotor 31 in the fixed cylinder 30 is supported and which communicates with the outlet 11 of the main extruder 1; an outlet 33 formed on the other side where the rotor 31 in the fixed cylinder 30 floats and which communicates with the inlet 27 for the injection of thermo-plastics to the cooling extruder 2; a stator 34 installed on the inner face of the fixed cylinder 30; a number of isolated semi-spherical cavities 35, 36 formed on the inner face of the stator 34 and on the outer face of the rotor 31, the cavities 35 on the inner face of the stator 34 partially overlapping the cavities 36 on the periphery of the rotor 31 during rotation; a bearing 37 for rotatably supporting the rotor 31; packing 38; a packing pusher a passageway 40 of a refrigerant for cooling the packing; a heater 41 arranged on the periphery of the fixed cylinder 30, and a pipe 42 for supplying a refrigerant to the inside of the rotor 31.

The operation of the apparatus shown in FIG. 1 will now be described. By rotating the first and second screws 5, 20 in the directions of arrows A, B, and by rotating the rotor 31 separately from the first and second screws 5, 20 in the direction of arrow C, a thermoplastic material is supplied from the material hopper 13 to the first barrel 4. The material, i.e., plastic is transported by the first screw 5 in the direction of arrow D and heated and caused to melt by the heater 14. A foaming agent is added through the inlet 9 to the molten plastic under pressure and the foaming agent added is pre-mixed with the thermo plastic by pins 8 of the first kneader means 6. The thermoplastic containing the foaming agent is subsequently passed through the outlet 11 and inlet 32 before being supplied into the fixed cylinder 30 of the mixer 3. In the mixer 3, the thermo plastic is agitated and mixed by the cavities 36 of the rotor 31 and the cavities 35 of the stator 34 and the foaming agent is homogeneously dispersed in the thermo plastic.

Referring to FIGS. 2a–h, the typical mixing and agitating principle will be described using linear material. The striation extruded from the bottom of the cavity 35 on the left of FIG. 2a is extended along the inner periphery thereof and, as shown in FIG. 2b, the front end of the striation is pulled by the edge i of the cavity 36 of the rotor 31 rotating in the direction of the arrow and caused to change its direction so as to conform to the state shown in FIG. 2c. As shown in FIG. 2d, the front end of the striation is folded by the edge ii and, as shown in FIG. 2e, the front end thereof is cut by the edge ii and the stator 34 and, as shown in FIG. 2f, the front end thereof is bent by the edge iii and, as shown in FIG. 2g, the front end thereof is cut by the edge iii and the stator 34 and, as shown in FIG. 2h, the front end thereof is bent by the edge iv. The same operation is repeated thereafter and the front end of the linear material is successively cut and the cut portion is accumulated within the cavities.

According to this principle, the plastic material is extended to form a thin plate and cut to pieces wherein a foaming agent or any other additive is homogeneously dispersed in the thermo plastics. thermo plastic with the foaming agent homogeneously dispersed therein is supplied to the second barrel 16 of the cooling extruder 2 through the outlet 33 and the inlet 27. The thermo plastic containing the foaming agent is transported by the rotation of the second screw 20 in the direction of arrow E and is cooled by refrigerant passing through the refrigerant passage 17 to a temperature suitable for foaming. It is conveyed and extruded out of the outlet 22 for foaming purposes.

Figure 3:
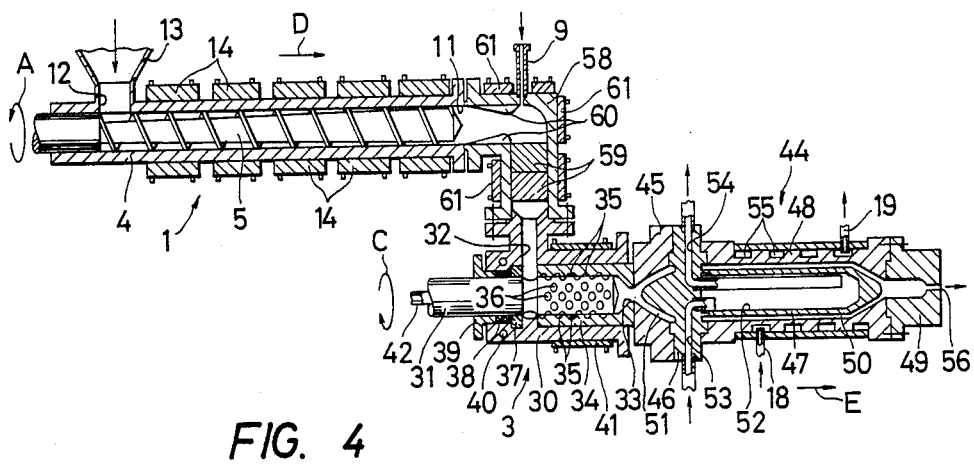
FIG. 3 is a vertical sectional view of another embodiment of the apparatus of the present invention.

Referring to FIG. 3, another embodiment of the present invention will be described. In FIG. 3, like reference numbers designate like parts as shown in FIG. 1 and a description of these components will be omitted. In the apparatus of FIG. 3 a cooling unit 44 comprising a coupler 45 is coupled to the outlet of the stator 34 of the mixer 3; an intermediate body 46 is coupled to the coupler 45; an inner core 47 is provided in the center of the side of the intermediate body 46; an external cylinder 48 is concentrically fitted to the inner core 47 with one end coupled to the intermediate body 46; and a die 49 is fixed to the other end of the external cylinder 48. A passageway 50 for the thermo plastic material formed between the inner core 47 and the external cylinder 48 communicates with the mixer 3 through a communicating passageway 51 formed in the coupler 45 and the intermediate body 46. A cooling space 52 is formed in the inner core 47 and an inlet 53 and an outlet 54 for refrigerant are passed from the periphery of the intermediate body 46 up to the cooling space 52 therethrough. A spiral refrigerant passageway 55 is formed in the external cylinder 48 and an orifice 56 is formed in the die 49. An L-shaped pipe 58 is used to communicate the outlet 11 of the main extruder 1 with the inlet 32 of the mixer 3. A static mixer 59 is arranged on the mixer end side of the communicating pipe 58 and a throttle nozzle 60 is arranged on the extruder side of the communicating pipe 58. Numeral 61 designates a heater arranged on the periphery of the communicating pipe 58.

The operation of the apparatus shown in FIG. 3 will now be described. The velocity of the molten plastic extruded from the outlet 11 of the extruder 1 is accelerated by the throttle nozzle 60 and the foaming agent supplied from the inlet 9 is added to the accelerated thermo plastic under pressure. The thermo plastic containing the foaming agent is transported to the static mixer 59 wherein the thermo plastic and the foaming agent are preliminarily mixed. Subsequently, the thermo plastic containing the foaming agent is discharged from the static mixer 59 and is coveyed to mixer 3 where the thermo plastic and the foaming agent are thoroughly kneaded under the same action as in the case of the first embodiment. The plastic with the foaming agent homogeneously dispersed in the mixer 3 is then supplied to the thermo plastic passage 50 of the cooling unit 44. The thermo plastic containing the foaming agent is cooled in the thermo plastic passage 50 by the refrigerant passing through the passageway 55 while moving in the direction of the arrow E and is then discharged from the outlet 56 for foaming.

Figure 4:
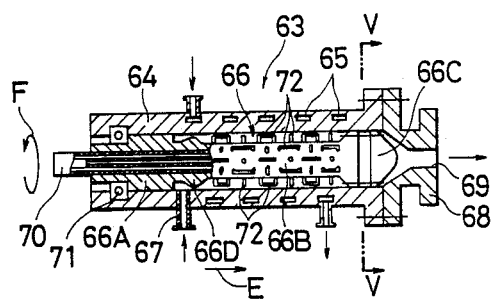
FIG. 4 is a vertical sectional view of a modified cooling unit of the apparatus of FIGS. 1 and 3.
Figure 5:
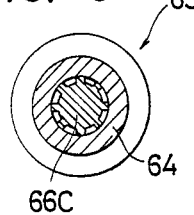
FIG. 5 is a view taken on line V—V of FIG. 4.

In carrying out the method of the present invention, a cooler 63 as shown in FIG. 4 or the cooling unit 44 as shown in FIG. 3 may be used in place of the cooling extruder 2 shown in FIG. 1. The cooler 63 shown in FIGS. 4 and 5 and installed on the downstream side of the mixer 3 according to the first and second embodiments of the invention is described in detail below. The cooler 63 comprises an outer cylinder 64 having a spiral refrigerant passageway 65; a cantilever main shaft 66 rotatably inserted in the outer cylinder 64; a thermo plastic inlet 67 formed through the neighborhood of the end where the main shaft of the outer cylinder 64 is supported; a die 68 with an orifice 69; and a pipe 70 for supplying a refrigerant to a cooling space provided in the main shaft 66. The main shaft 66 comprises a large diameter end portion 66A rotatably supported on the outer cylinder 64 through a bearing 71, a central small diameter portion 66B and a large diameter front end portion 66C, an annular protrusion 66D being installed in a position slightly closer to the downstream side of the central small diameter portion 66B facing the plastic inlet. A number of hurdle type kneading bars 72 are protruded from a portion farther downstream than the annular protrusion 66D of the central small diameter portion 66B.

In the cooler 63 shown in FIG. 4 and thus constructed, the plastic containing the foaming agent and introduced in the outer cylinder 64 from the mixer 3 through the plastic inlet 67 is forced over the annular protrusion 66D in the direction of arrow E and kneaded by the kneading bars 72 of the main shaft 66 rotating in the direction of arrow F and then extruded from the orifice 69 through the gap between the large diameter front end portion 66C and the outer cylinder 64.

EXAMPLES 1, 2 AND 3 AND COMPARATIVE EXAMPLE 1

The apparatus of FIG. 1 was used in Examples 1, 2 and 3 and had the following specifications: an internal diameter of 50 mm of the first barrel 4 of extruder 1; an internal diameter of 65 mm of the second barrel 16 of cooling extruder 2; an internal diameter of 50 mm of the stator 34 of mixer 3; a gap of 0.4 mm between the stator 34 and the rotor 31; six cavities respectively in the circumferential directions of the stator 34 and the rotor 31 and seven rows of cavities 35, 36 in the axial directions thereof; respective diameters of 23 and 24.5 mm of the semi-spherical cavities 35, 36; depths of 8 and 9.5 mm of the cavities 35, 36; distances of 22 mm between the centers of the cavities in the axial direction; 106 rpm of the rotor of mixer 3; a temperature of 123° C. of the molten material at the exit of the cooling extruder 2; a width of 100 mm and a height of 1 mm of the orifice 22 of the die 21.

100 parts by weight of polystyrene [Styron 679 of Asahi Kasei] as a base resin was uniformly mixed with 0.3 part by weight of fine powdery talc as a nucleating agent and 2.0 parts by weight of hexabromocyclododecane as a fire retardant and supplied to the main extruder 1, which was operated so as to extrude the material at a rate of 55 kg per hour. In addition, 12.5 parts by weight of dichlorodifluoromethane were added as a foaming agent from the inlet 9 for the foaming agent to 100 parts by weight of the base thermo plastic under pressure. As a result, foamed plates about 250 mm wide, 25 mm thick and 40 kg/m$^3$ in density were obtained through a sizer attached to the die 21 (see Table 1).

The results shown for Examples 2 and 3 were obtained through similar tests carried out by changing the quantity of the foaming agent and the rpm of the rotor 31. The comparative example of Table 1 shows a case where the mixer 3 is removed from the apparatus of FIG. 1.

TABLE 1

|  | Quantity of foaming agent for base thermo plastic wt % | Foaming condition | Discharge quantity (Kg/H) | Temperature of the melt resin (°C.) | r.p.m. of rotor 31 | Density of foam (kg/m$^3$) |
| --- | --- | --- | --- | --- | --- | --- |
| Example 1 | 12.5 | Uniform stable foaming | 55 | 123 | 106 | 40 |
| Example 2 | 14.6 | Uniform stable foaming | 56 | 124 | 200 | 35 |
| Example 3 | 12.8 | Uniform stable foaming | 57 | 124 | 100 | 40 |
| Comparative Example 1 | 11.0 | Uneven foaming with occasional voids | 55 | 125 | — | 46 |

EXAMPLE 4 AND COMPARATIVE EXAMPLE 2

The apparatus of FIG. 1 was used in this example and had the following specifications: an internal diameter of 50 mm of the first barrel 4 of extruder 1; an internal diameter of 65 mm of the second barrel of cooling extruder 2; an internal diameter of 90 mm of the stator 34 of mixer 3; a gap of 0.2 mm between the stator 34 and the rotor 31; ten cavities respectively in the circumferential directions of the stator 34 and the rotor 31 and seven rows of cavities 35, 36 in the axial directions thereof; respective diameters of 27 and 28 mm of the semi-spherical cavities 35, 36; depths of 8 and 9.5 mm of the cavities 35, 36; distances of 25 mm between the centers of the cavities in the axial direction; 100 rpm of the rotor of mixer 3, a temperature of 159° C. of the molten material passing through the cooling extruder 2, a diameter of 60 mm and a gap of 0.6 mm of orifice 22 of the die 21 in the form of a circular slit.

100 parts by weight of polystyrene [Styron 691 of Asahi Kasei] as a base thermo plastic was uniformly mixed with 2.0 parts by weight of fine powdery talc as a nucleating agent and supplied to the main extruder 1, which was operated so as to extrude the material at a rate of 28 kg per hour. In addition, 3.5 parts by weight of butane were added as a foaming agent from the inlet 9 for the foaming agent to 100 parts by weight of the base thermo plastic under pressure. As a result, uniformly minutely foamed sheets about 633 mm wide, 25 mm thick and 179 Kg/m² in the unit weight were cooled and sized through a cooling mandrel attached to the die at the distance and slit at one place in the extrusion direction.

Moreover, the foamed materials thus obtained were aged for seven days in the room temperature and then the cell diameter was measured according to ASTM D 2842-69, wherein the materials were heated at 120° C. for 12 seconds for examining secondary foaming thickness as assessing the formability The results obtained are shown in Table 2.

A similar test with the mixer 3 removed from the apparatus used in Example 4, was conducted to obtain foamed sheets about 2 mm thick, 633 mm wide and 176 g/m² in the unit weight adjusting the temperature of thermoplastic to 158° C. However, a number of concentrated powdery talc were seen in the sheets with rough cells. Secondary foaming was also inferior.

TABLE 2

|  | Diameter of cell (mm): | | | Secondary foam thickness (mm) |
|---|---|---|---|---|
|  | Machine direction | Traverse direction | Vertical direction | |
| Example 4 | 0.22 | 0.21 | 0.21 | 3.28 |
| Comparative Example 2 | 0.28 | 0.31 | 0.27 | 3.04 |

EXAMPLE 5

The apparatus used in Example 4 was used in this example with the exception that the die 21 and the cooling mandrell according to the Example 1 were used.

In the apparatus thus arranged, polyethylene (Yukaron HE-30 made by Mitsubishi Yuka K.K.) was used as a base thermo plastic. 100 parts by weight of the base thermo plastic was mixed with 10 parts by weight of a mutual impregnation polymer (Piocelan (trade mark) of Sekisui Kaseihin Kogyo K.K.) obtained by impregnating styrene monomer in a polyethylene plastic while polymerizing the monomer, which is composed of 30% by weight of ethylene and 70% by weight of styrene and has 18.6% by weight of cross-linking ratio, the cross-linking ratio can, for example, be obtained by measuring an amount of the insoluble component of the unit sample in boiling xylene, and with 0.5 part by weight of talc as a nucleating agent. A mixture thus obtained was supplied to the extruder at a rate of 30 kg per hour.

On the other hand, 14 parts by weight of a mixture of 70% by weight of dichlorodifluoromethane and 30% by weight of butane were supplied as a foaming agent under pressure. The extrusion was then carried out at 100 rpm for the mixer 3 and cooled a temperature of 110° C. for the molten thermo plastics passing through the cooling extruder for foaming purposes. The foamed materials obtained were externally fine, uniform foamed plates about 20 mm thick, 230 mm wide and 33 kg/m³ in density.

COMPARATIVE EXAMPLE 3

This example was carried out according to the method of Example 5 except that the mixer 3 was removed from the apparatus. High density foamed spots due to inferior mixing and dispersion of PIOCELAN Resin and a number of foaming agent gas accumulations were occured. Only foamed plates having uneven surfaces were obtained.

Figure 6:
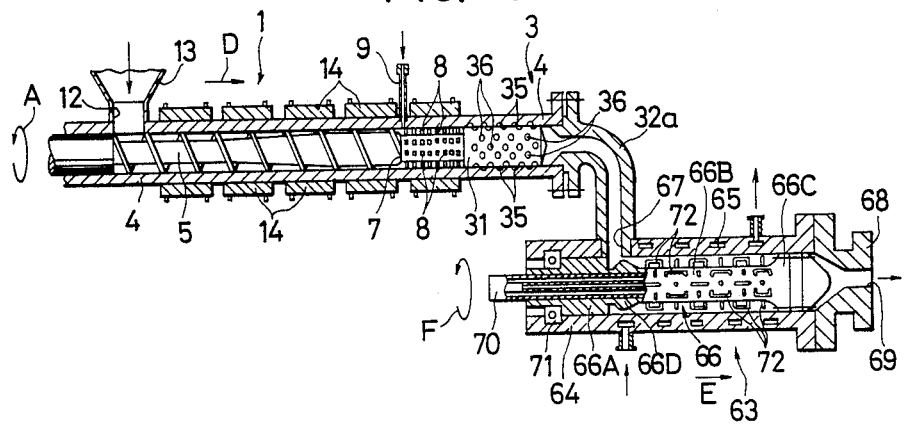
FIG. 6 is a vertical sectional view of still another embodiment of the apparatus of the present invention.

Referring to FIG. 6, another embodiment of the present invention will now be described. In FIG. 6, like reference characters designate like and corresponding parts of FIGS. 1 and 4, wherein an extruder 1 and a cooler 63 are arranged in parallel but their axes are shifted from each other. A pipe 32a for supplying the thermoplastic material connects the outlet 11 of the extruder 1 and the injection port 67 of a cooler 63. Numeral 31 designates a rotor concentrically connected to a column 7 installed at the front end of a screw 5, and with a number of recessed isolated semi-spherical cavities 35, 36 respectively formed on the outer face of the rotor 31 and the inner face of a barrel 4 arranged opposite thereto. The cavities 35 of the barrel 4 and the cavities of 36 of the rotor 31 respectively overlap one another therebetween to form a mixer where the plastic is transferred.

The length of the rotor 31 should be two to eight times (preferably four to eight times) as large as the diameter of the screw 5. If the length is less than twice as large as the diameter, kneading will be insufficient, whereas heating will become too great if it is more than eight times the latter.

The length of the column 7 is normally one to seven times (preferably two to five times) as large as the diameter of the screw 5. If the length is less than the diameter of the screw, pre-kneading will be insufficient, whereas the kneading effect will not be further improved if it is greater than seven times.

The cross-sectional area where thermo plastic is allowed to pass through the column 7 is made greater than (preferably 1.5 to 3 times as large as) that at the front end of the screw 5. Otherwise, the quantity of the thermo plastic supplied to the column 7 will be excessive and make sufficient kneading impossible. As the protrusions 8 provided on the column 7, there are columnar pins, cutout screw flights and Dulmage screws.

The screw 5 and the main shaft 66 are respectively rotated in the directions of arrows A and F and the material, i.e., thermo plastic is supplied to the barrel 4 through the inlet 12. The thermo plastic is sent in the direction of arrow D by the screw 5 and heated and melting by the heater 14 during that time. The foaming agent is added from the inlet 9 to the molten thermo plastic under pressure, whereby the foaming agent and the thermo plastic are preliminarily mixed together. Subsequently, the thermo plastic containing the foaming agent is forced to enter the gap between the rotor 31 and the barrel 4 and is kneaded by the cavities 35, 36 so that the foaming agent may be uniformly dispersed in the thermo plastic. The kneading principle is the same as that described in conjunction with FIG. 2. The thermo plastic wherein the foaming agent has been dispersed uniformly is conveyed to the outer cylinder 64 of the coolor 63 through the supply pipe 32a and then in the direction of arrow E over the annular protrusions 66D. The thermo plastic is kneaded by hurdle-shaped kneading bars rotating in the direction of arrow F and, after being appropriately cooled, is passed through the gap between the large diameter front end portion 66C and the outer cylinder 64 and extruded from the outlet 69 for foaming.

EXAMPLE 6 AND COMPARATIVE EXAMPLE 4

The apparatus shown in FIG. 6 was used and had the following specifications: an internal diameter of 50 mm of the first barrel 4 of extruder 1; a diameter of 50 mm of the screw 5; a length of 250 mm of the column 7; a length of 250 mm of the rotor 31; a gap of 0.4 mm between the rotor 31 and the barrel 4; six cavities respectively in the circumferential direction of the rotor 31 and the barrel 4 and seven rows of cavities 35, 36 in the axial directions thereof; a respective diameter of 23.0 and 24.5 mm of the semi-spherical cavities 35, 36; a depth of 8 and 9.5 mm of the cavities 35, 36; a distance of 22 mm between the cavities in the axial directions; 106 rpm of the screw 5, a temperature of 123° C. of the molten material passing through the cooler 63, a width of 100 mm and a height of 1 mm of the orifice 69 of the die 68.

100 parts by weight of polystyrene [Styron 679 of Asahi Kasei]as a base thermo plastic was uniformly mixed with 0.3 part by weight of talc as a nucleating agent and 2.0 parts by weight of hexabromocyclododecane as a fire retardant and supplied to the main extruder 1, which was operated so as to extrude the material at a rate of 55 kg per hour. In addition, 12.5 parts by weight of dichlorodifluoromethane were added as a foaming agent from the inlet 9 for the foaming agent to 100 parts by weight of the base thermo plastic under pressure. As a result, foamed plates about 250 mm wide, 25 mm thick and 40 kg/m³ in density were obtained through a sizer attached to the die 21 (see Table 3).

In Comparative Example 4, the rotor 31 was removed to dispense with the cavities 35 of the barrel 4.

TABLE 3

| | Quantity of foaming agent for base thermo plastics (wt %) | Foaming condition | Discharge quantity (Kg/H) | Temperature of the melt resin (°C.) | r.p.m. of screw 5 | Density of foam kg/m³ |
|---|---|---|---|---|---|---|
| Example 6 | 12.5 | Uniform stable foaming | 55 | 123 | 106 | 40 |
| Comparative Example 4 | 11.0 | Uneven foaming with occasional voids | 55 | 125 | 106 | 46 |

As is obvious from Table 3, uniformly foamed materials can be obtained according to the method and apparatus of the present invention.

What is claimed is:

1. A method for producing a foamed thermoplastic material comprising melting and extruding said thermoplastic material by means of a screw extruder; adding a foaming agent to the molten thermoplastic; mixing said foaming agent and molten thermoplastic in a mixing means and cooling the resultant mixture of foaming agent and thermoplastic to a temperature suitable for foaming in a cooling means; said mixing means comprising a rotor supported in a stator so as to form a gap for the passage of the mixture of foaming agent and thermoplastic during rotation of the rotor; said rotor having semi-spherical cavities formed on the outer face thereof and said stator having semi-spherical cavities formed on the inner face thereof, the cavities on said rotor and the cavities on the stator being arranged to overlap with each other during rotation of the rotor and to cause transfer of the mixture of foaming agent and thermoplastic between the cavities during passage of the mixture through said mixing means.

2. A method for the production of a foamed thermoplastic material as claimed in claim 1, wherein the thermoplastic and the foaming agent are premixed before being further mixed in said mixing means.

3. A method for the production of a foamed thermoplastic material as claimed in claim 1, wherein the rotor of said mixing means is rotated independently the screw of said extruder.

4. A method for the production of a foamed thermoplastic materials as claimed in claim 1, wherein the rotor of said mixing means is connected to the front end of the screw of said extruder.

5. A method for the production of a foamed thermoplastic material as claimed in claim 1, wherein said foaming agent is a liquid or solid at room temperature.

6. A method for the production of a foamed thermoplastic material as claimed in claim 1, wherein said mixture of foaming agent and thermoplastic is heated during mixing in said mixing means.

7. An apparatus for producing a foamed thermoplastic material comprising screw extruder for melting and extruding said thermoplastic material; mixing means communicating with said screw extruder for receiving a mixture of a foaming agent and molten thermoplastic from said screw extruder and for mixing said foaming agent and said molten thermoplastic material and cooling means communicating with said mixing means for cooling the mixture of foaming agent and thermoplastic formed in said mixing means to a temperature suitable for foaming, said mixing means comprising a rotor supported in a stator so as to form a gap for the passage of the mixture of foaming agent and thermoplastic during rotation of the rotor; said rotor having semi-spherical cavities formed on the outer face thereof and said stator having semi-spherical cavities formed on the inner face thereof, the cavities on said rotor and the cavities on the stator being arranged to overlap with each other during rotation of the rotor and to cause transfer of the mixture of foaming agent and thermo plastic between the cavities during passage of the mixture through said mixing means, an injection port of a foaming agent being provided upstream of said mixing means.

8. An apparatus for the production of a foamed thermoplastic material as claimed in claim 7, wherein said mixing means further comprises a passageway for refrigerant provided at a portion wherein said rotor is supported in said stator.

9. An apparatus for the production of a foamed thermoplastic material as claimed in claim 7, wherein the rotor of said mixer is capable of rotation independently of rotation of the screw of said extruder.

10. An apparatus for the production of a foamed thermo plastic material as claimed in claim 7, wherein the rotor of said mixer is connected to the front end of the screw of said extruder, and said injection port of a foaming agent is provided for the extruder.

11. An apparatus for the production of a foamed thermoplastic material as claimed in claim 10, further comprising preliminary kneading means between said screw extruder and said mixing means.

* * * * *

UNITED STATES PATENT AND TRADEMARK OFFICE
CERTIFICATE OF CORRECTION

PATENT NO. : 4,746,478

DATED : May 24, 1988

INVENTOR(S) : Hiromu FUJISAKI ET AL

Figure 2:
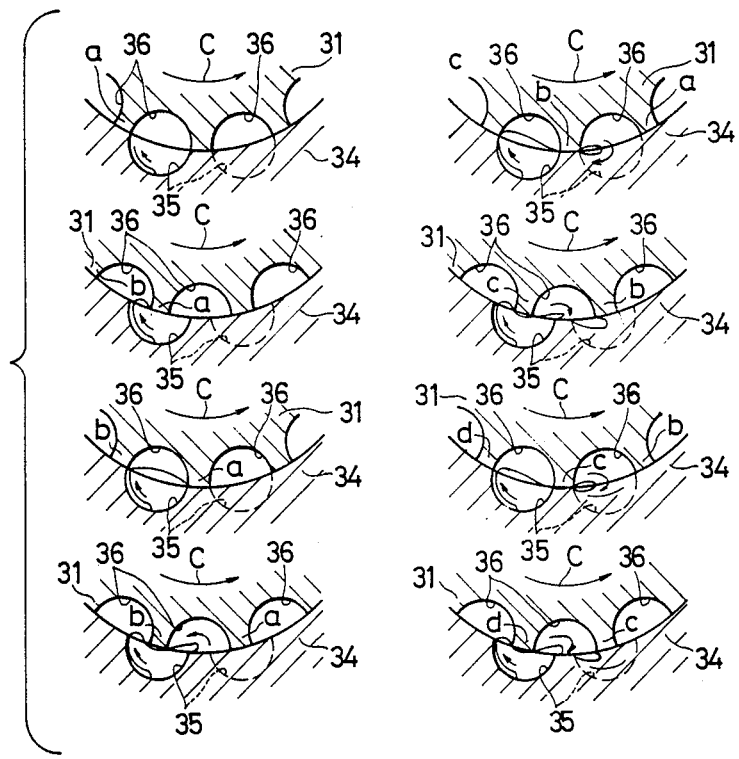
FIGS. 2a–h are schematic views illustrating the principles of mixing and agitation using a cavity transfer mixer.

It is certified that error appears in the above-identified patent and that said Letters Patent is hereby corrected as shown below:

```
Column 2, line 58, "FIGS. 2a-h are" should read --- FIG. 2 is
a series of ---.

Column 5, line 56, "FIGS. 2a-h" should read --- FIG. 2 ---, and
          line 57, after "material." insert --- In the
following description of FIG. 2, the schematic views on the
left side are identified as FIG. 2a - FIG. 2d (from top to
bottom) and the schematic views on the right side are
identified as FIG. 2e -FIG. 2h (from top to bottom). ---.
```

Signed and Sealed this

Fourth Day of October, 1988

Attest:

DONALD J. QUIGG

Attesting Officer

Commissioner of Patents and Trademarks